United States Patent

Oh et al.

[11] Patent Number: 5,511,064
[45] Date of Patent: Apr. 23, 1996

[54] SPEECH PATH SWITCHING CONTROL APPARATUS AND METHOD FOR MAKING MAINTENANCE OF SPEECH POSSIBLE UPON OCCURRENCE OF FAULT IN ECHO CANCELLATION

[75] Inventors: Don S. Oh; Dong J. Shin; Hun Lee, all of Daejeon, Rep. of Korea

[73] Assignee: Electronics and Telecommunications Research Institute, Daejeon, Rep. of Korea

[21] Appl. No.: 325,126

[22] Filed: Oct. 18, 1994

[30] Foreign Application Priority Data

Oct. 19, 1993 [KR] Rep. of Korea ............... 1993/21725

[51] Int. Cl.$^6$ ............................... H04B 3/46; H04J 3/14; H04Q 11/04
[52] U.S. Cl. ............................... 370/15; 370/32.1; 370/66; 379/3; 379/5; 379/406
[58] Field of Search ............................... 370/13, 15, 16, 370/16.1, 24, 29, 32, 32.1, 58.1, 58.2, 58.3, 59, 66, 68, 68.1; 379/3, 5, 9, 15, 16, 406, 410, 411

[56] References Cited

U.S. PATENT DOCUMENTS

| | | | |
|---|---|---|---|
| 4,032,719 | 6/1977 | Blasbalg | 370/66 |
| 4,554,417 | 11/1985 | Boyer | 379/410 |
| 4,740,953 | 4/1988 | Matsumoto et al. | 370/66 |
| 4,918,727 | 4/1990 | Rohrs et al. | 379/3 |
| 4,922,530 | 5/1990 | Kenney et al. | 379/411 |
| 5,040,174 | 8/1991 | Takeuchi et al. | 370/66 |
| 5,255,264 | 10/1993 | Cotton et al. | 370/32.1 |

OTHER PUBLICATIONS

IEEE Transactions On Communications, vol.COM–26, No. 5, May, 1978, "A Twelve–Channel Digital Echo Canceler", Donald L. Duttweiler, pp. 647–653.
Proceedings Of The IEEE, vol. 68, No. 8, Aug., 1980, "Silencing Echoes On The Telephone Network", Man Mohan Sondhi et al., pp. 948–963.
IEEE Transactions On Communications, vol. 38, No. 10, Oct., 1990, "An Adaptive Multiple Echo Canceller For Slowly Time–Varying Echo Paths", Philip Chu–Wah YIP et al., pp. 1693–1698.

Primary Examiner—Alpus Hsu
Attorney, Agent, or Firm—Spencer & Frank

[57] ABSTRACT

Speech path switching control apparatus and a method for making maintenance of speech possible even upon occurrence of a fault in echo cancellation. The speech path switching control apparatus includes a time switch for receiving PCM voice data from a space switch through a switch network link and performing time slot interchange with trunk lines, an echo canceller connected to the time switch through a plurality of sub-highways to cancel echoes, an access switching processor for discriminating whether echo cancellation is required for a trunk call allocated with a particular one of the trunk lines and outputting the resultant discrimination signal, and a time switch control processor for controlling the time switch and the echo canceller in response to the discrimination signal from the access switching processor. If the echo cancellation is not required or the echo canceller is abnormal, there is formed a speech path which is not passed through the echo canceller. In the case where the echo cancellation is required and the echo canceller is normal, there is formed a speech path which is passed through the echo canceller.

3 Claims, 4 Drawing Sheets

SPEECH PATH SWITCHING CONTROL APPARATUS AND METHOD FOR MAKING MAINTENANCE OF SPEECH POSSIBLE UPON OCCURRENCE OF FAULT IN ECHO CANCELLATION

BACKGROUND OF THE INVENTION

1. Field of the Invention

The present invention relates in general to communication systems such as electronic exchanges and the like, and more particularly to speech path switching control apparatus and a method in which a disabling function of an echo canceller required by a CCITT recommendation is effectively performed and maintenance of speech is made possible even upon occurrence of a fault in echo cancellation.

2. Description of the Prior Art

Generally, in a long-distance telephone network or a digital mobile communication network, a delay is in excess of several tens ms due to a transfer distance, voice data processing, etc.

Two wires are used between a public switched telephone network and an exchange to perform bidirectional speech. Four wires are used in a digital exchange or telephone network to perform the bidirectional speech. For this reason, a 2/4 wire converter is used in a subscriber interface circuit of the public switched telephone network. In this case, an echo is generated due to an impedance mismatch of the subscriber interface circuit.

In the digital mobile communication network, voice coding is performed for voice data to reduce a using band by reason of the effectiveness of radio channels. In this case, a considerable processing delay occurs differently from a PCM manner or an ADPCM manner in the public switched telephone network.

Namely, when the digital mobile communication network is connected with the public switched telephone network, an echo with a considerable delay (e.g., greater than 100 ms) is generated. As a result, this echo must be canceled.

In the case where the digital mobile communication network is connected with the public switched telephone network, a part of voice data from a mobile station is reflected back to the mobile station as an echo by the 2/4 wire converter in the subscriber interface circuit. As a result, an echo canceller is built in a PCM trunk line between the digital mobile communication network and the public switched telephone network to cancel the echo. When PCM voice data from the mobile station is transmitted to the public switched telephone network, the echo canceller stores the PCM voice data and applies the stored PCM voice data to its digital filter which has the same characteristic as that of an impulse response of an echo path resulting from the delay through the 2/4 wire converter in the subscriber interface circuit. Then, the resultant output from the digital filter is subtracted from the echo reflected from the public switched telephone network. Therefore, a subscriber accommodated by the mobile station is not influenced by the echo.

Since such a conventional echo canceller is built in a T1 or E1 truck line separately from a mobile switching center, it is impossible to use maintenance and repair functions of the mobile switching center. For this reason, it is difficult for maintenance and repair of the echo canceller to be done.

In the case where the echo canceller must not be operated, such as, for example, signalling over the trunk line or SS No. 7 signal digital data transmission, namely, in the case where the echo canceller must be disabled to satisfy a CCITT recommendation G.165, it needs additional tone detection and disabling circuits. This results in an increase in the cost per line.

The reliability of the echo canceller has an effect on the reliability of the trunk line because the echo canceller is built in the trunk line. Namely, if, since a particular echo canceller is used in a particular T1 or E1 trunk line, a fault occurs in the echo canceller, the corresponding trunk line is not available, thereby making speech impossible. For this reason, degradation in the reliability of the echo canceller results in a falling-off of the reliability of the trunk line.

SUMMARY OF THE INVENTION

Therefore, the present invention has been made in view of the above problems, and it is an object of the present invention to provide speech path switching control apparatus and a method in which an echo canceller is linked with a time switch in a switching network of a mobile switching center, so that a disabling function of the echo canceller is effectively performed and maintenance of speech is made possible even upon occurrence of a fault in echo cancellation.

In accordance with one aspect of the present invention, there is provided a speech path switching control apparatus comprising time switching means for receiving PCM voice data from a space switch through a switch network link and performing time slot interchange with trunk lines; echo cancellation means connected to said time switching means through a plurality of sub-highways to cancel echoes; access switching control means for discriminating whether echo cancellation is required for a trunk call allocated with a particular one of the trunk lines and outputting the resultant discrimination signal; and time switching control means for controlling said time switching means and said echo cancellation means in response to the discrimination signal from said access switching control means.

In accordance with another aspect of the present invention, there is provided a method of operating a speech path switching control apparatus having time switching means, echo cancellation means, time switching control means and access switching control means, comprising the steps of (a) initializing said time switching means, said echo cancellation means, said time switching control means and said access switching control means, allocating a trunk line to a trunk call through a signalling process and allowing said access switching control means to discriminate whether echo cancellation is required for the trunk call allocated with the trunk line; (b) forming under control of said time switching control means a speech path which is not passed through said echo cancellation means, if it is discriminated at said step (a) that the echo cancellation is not required for the trunk call allocated with the trunk line, and discriminating whether said echo cancellation means is normal, if it is discriminated at said step (a) that the echo cancellation is required for the trunk call allocated with the trunk line; (c) looping back sub-highway data of TTL levels including a speech channel, if it is discriminated at said step (b) that said echo cancellation means is not normal, and transmitting the looped-back data to said time switching means through sub-highways, each of which accommodates PCM 32 channels, to form under the control of said time switching control means the speech path which is not passed through said echo cancellation means; and (d) forming a speech path which is passed through said echo cancellation means, if it is discriminated at said step (b) that said echo cancellation means is normal.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

A time switch performing time slot interchange (TSI) is one of fundamental elements in a switching network of a digital switching system. The time switch switches all time slots on an incoming highway to an outgoing highway. The time switch performs a line switching operation by interchanging time slots on a time division multiplexed PCM highway with each other. Namely, the time switch transfers voice data of a time slot 0 TS0 to a time slot 1 TS1 and vice versa, so that speech is made possible between subscribers allocated with the time slots TS0 and TS1. Since there are in practice present a plurality of highways, the TSI may be performed between the time slots on the different highways.

Figure 1:
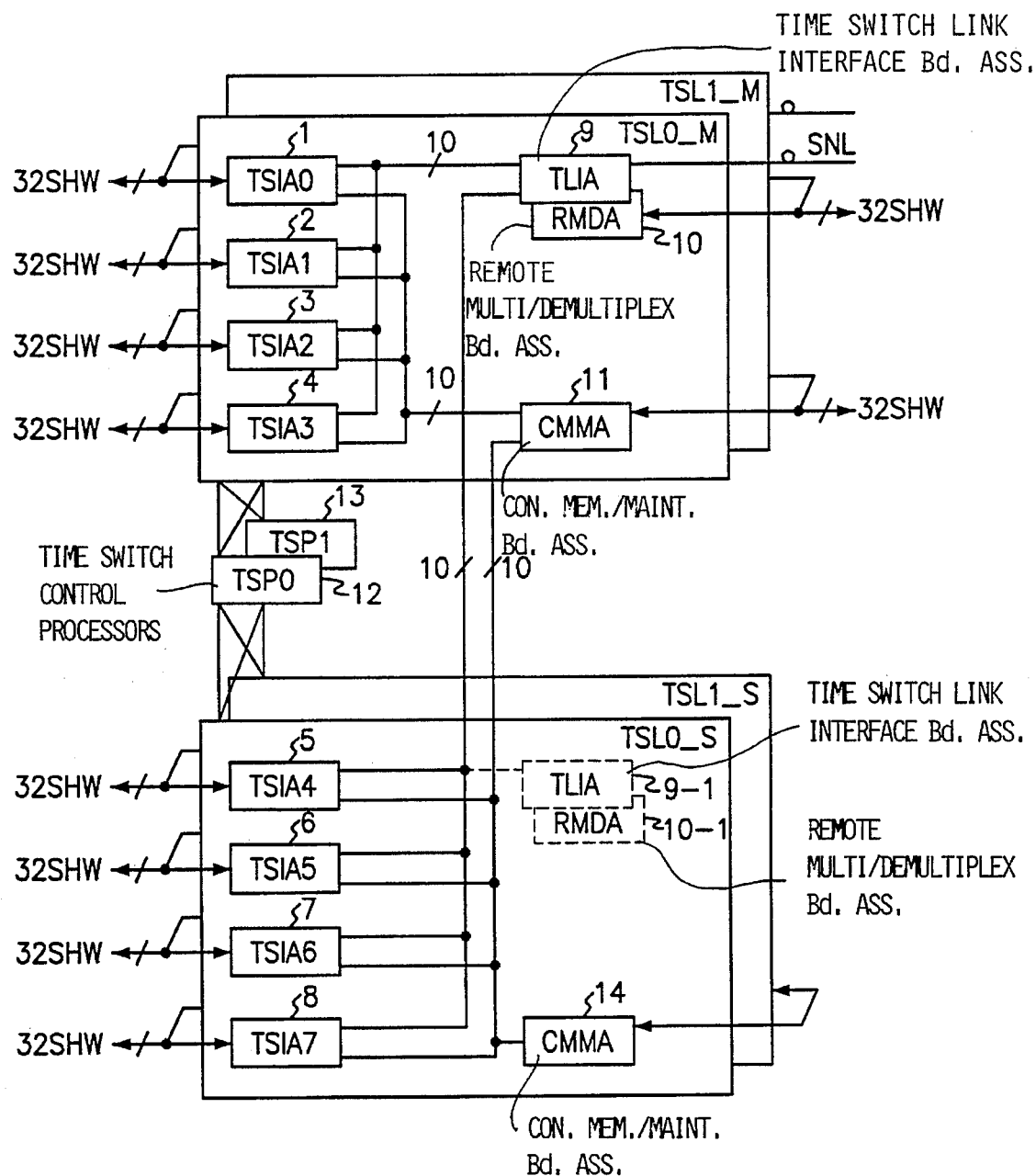
FIG. 1 is a block diagram of a time switch in an electronic switching network.

Referring to FIG. 1, there is shown a block diagram of a time switch in an electronic switching network. In this drawing, the reference numerals 1 to 8 designate 1K bidirectional time slot interchange board assemblies (TSIAs), 9 a time switch link interface board assembly (TLIA), 10 a remote multiplex/demultiplex board assembly (RMDA), 11 and 14 control memory/maintenance board assemblies (CMMAs), and 12 and 13 time switch control processors (TSPs), respectively.

The TSIAs 1–8 are adapted to perform interfacing with the time division multiplexed PCM highways, multiplexing/demultiplexing, the TSI and code conversion.

The TLIA 9 is adapted to perform optical interfacing, data selection, multiplexing and IPC interfacing.

The RMDA 10 is adapted to be used instead of the TLIA 9 in the case where the time switch is employed in a remote switching system and interfaced through a T1 or E1 link.

Each of the CMMAs 11 and 14 has a junctor for processing loopback in the speech between the subscribers accommodated by the same time switch, and a transmission direction common control memory. The time switch is controlled by the TSPs 12 and 13.

The time switch has a bidirectional structure. In the case of transmission, the time switch receives the maximum of 4K input and provides 1K output. In the case of using two time switches, 8K input is received at the maximum and 1K output is provided. Namely, the multiplexing is performed by up to 8:1.

By the way, in the case where an echo canceller is built in a trunk line as well-known in the art and a fault occurs in a particular echo canceller board assembly of the echo canceller, it is impossible for the subscribers to talk through the corresponding echo canceller board assembly. In order to solve this problem, the echo canceller must be located in the switching network or linked with the time switch. In other words, if the fault occurs in the particular echo canceller board assembly of the echo canceller in the middle of monitoring continuously the speech between subscribers, a channel allocated to the corresponding echo canceller board assembly must be looped back so as not to be passed through the corresponding echo canceller board assembly. Also, if the fault occurs in the entire echo canceller, the speech path of the time switch must be changed so as not to be passed through the echo canceller. Therefore, the speech can be maintained even upon occurrence of a fault in the echo canceller. This can be realized by the present invention, as will hereinafter be described with reference to FIGS. 2 to 4.

Figure 2:
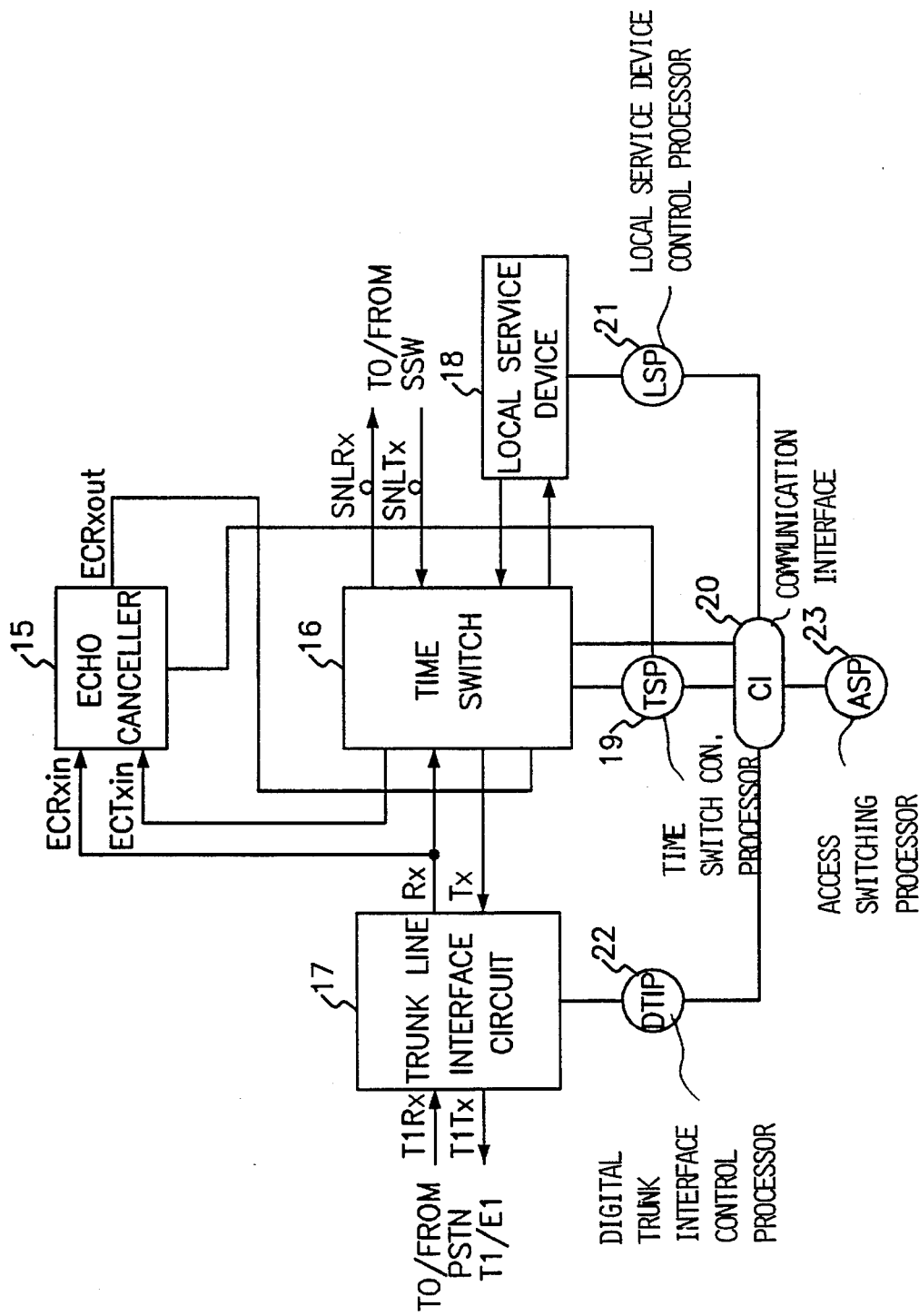
FIG. 2 is a block diagram of a speech path switching control apparatus in accordance with the present invention.

Referring to FIG. 2, there is shown a block diagram of a speech path switching control apparatus in accordance with the present invention. In this drawing, the reference numeral 15 designates an echo canceller, 16 a time switch, 17 a trunk line interface circuit, 18 a local service device, 19 a time switch control processor (TSP), 20 a communication interface (CI), 21 a local service device control processor (LSP), 22 a digital trunk interface control processor (DTIP) and 23 an access switching processor (ASP), respectively.

The time switch 16 is adapted to receive PCM voice data from a space switch SSW through a switch network link and perform the TSI with trunk lines.

The echo canceller 15 is connected to the time switch 16 through a plurality of sub-highways to cancel echoes.

The ASP 23 is adapted to discriminate whether echo cancellation is required for a trunk call allocated with a particular one of the trunk lines and output the resultant discrimination signal.

The TSP 19 is adapted to control the time switch 16 and the echo canceller 15 in response to the discrimination signal from the ASP 23.

Also, the time switch 16 and the echo canceller 15 are connected to the trunk line interface circuit 17 which performs an interfacing function between the time switch 16 and the T1 or E1 trunk line under control of the DTIP 22. The time switch 16 is also connected to the local service device 18 which performs an R2 trunk line signal process and provides busy and other tones to the time switch 16 under control of the LSP 21. The ASP 23 is connected to the TSP 19, the LSP 21 and the DTIP 22 through the CI 20 which performs communication among the processors.

The operation of the speech path switching control apparatus with the above-mentioned construction in accordance with the present invention will hereinafter be described in detail.

PCM voice data from a mobile subscriber connected to the digital switching system is transmitted to the space switch SSW in a TST switch network through the time switch accommodating the mobile subscriber and then space-switched thereby. The space-switched PCM voice data is transmitted/received to/from the time switch 16 through switch network transmission/reception links SNLTx and SNLRx at 65.536 Mbps. Then, the PCM voice data is time-switched under the control of the ASP 23 and the TSP 19 and sent to a public switched telephone network (PSTN) through the trunk line interface circuit 17 and the T1 or E1 trunk line.

In the PSTN, the received PCM voice data is transferred to a 2/4 wire converter in a subscriber interface circuit through various paths and then to the listener.

The echo reflected from the 2/4 wire converter in the middle of transferring the PCM voice data to the listener is transferred in the reverse order of the data transmission. Namely, the reflected echo is transferred to the mobile subscriber through the trunk line interface circuit 17, the time switch 16, the space switch SSW and the time switch accommodating the mobile subscriber.

Since the reflected echo provides annoyance for the talker, it must be cancelled by linking the time switch 16 with the echo canceller 15. Namely, when the PCM voice data from the mobile subscriber is transmitted to the trunk line interface circuit 17 through the time switch 16 accommodating the trunk line, it is also applied to the echo canceller 15 through a plurality of sub-highways ECTxin of the RS-485 type connected between the time switch 16 and the echo canceller 15. Each of the sub-highways ECTxin accommodates PCM 32 channels (2.048 Mbps). The PCM voice data transmitted through the trunk line interface circuit 17 to the PSTN is transferred to the 2/4 wire converter in the subscriber interface circuit through various paths in the PSTN. The echo reflected from the 2/4 wire converter is transferred to the trunk line interface circuit 17 in the reverse order of the data transmission. The transferred voice data is applied to the time switch 16 and the echo canceller 15.

In the case where cancellation is required, the voice data from the trunk line interface circuit 17 is applied to the echo canceller 15 through the sub-highways ECTxin of the RS-485 type, each of which accommodates the PCM 32 channels (2.048 Mbps). In the echo canceller 15, the received voice data is echo-cancelled and then applied to the time switch 16 through a plurality of sub-highways ECTxout of the RS-485 type connected between the echo canceller 15 and the time switch 16. Each of the sub-highways ECTxin accommodates PCM 32 channels (2.048 Mbps).

The data time-switched by the time switch 16 is transferred to the mobile subscriber through the optical link SNLRx, the space switch SSW and the time switch accommodating the mobile subscriber. As a result, the echo-cancelled voice data is transmitted to the mobile subscriber.

In the case where echo cancellation is not required, the voice data from the trunk line interface circuit 17 is applied to the time switch 16 through a plurality of subhighways Rx of the RS-485 type, each of which accommodates PCM 32 channels (2.048 Mbps). The data time-switched by the time switch 16 is transferred to the mobile subscriber through the optical link SNLRx, the space switch SSW and the time switch accommodating the mobile subscriber.

Figure 3:
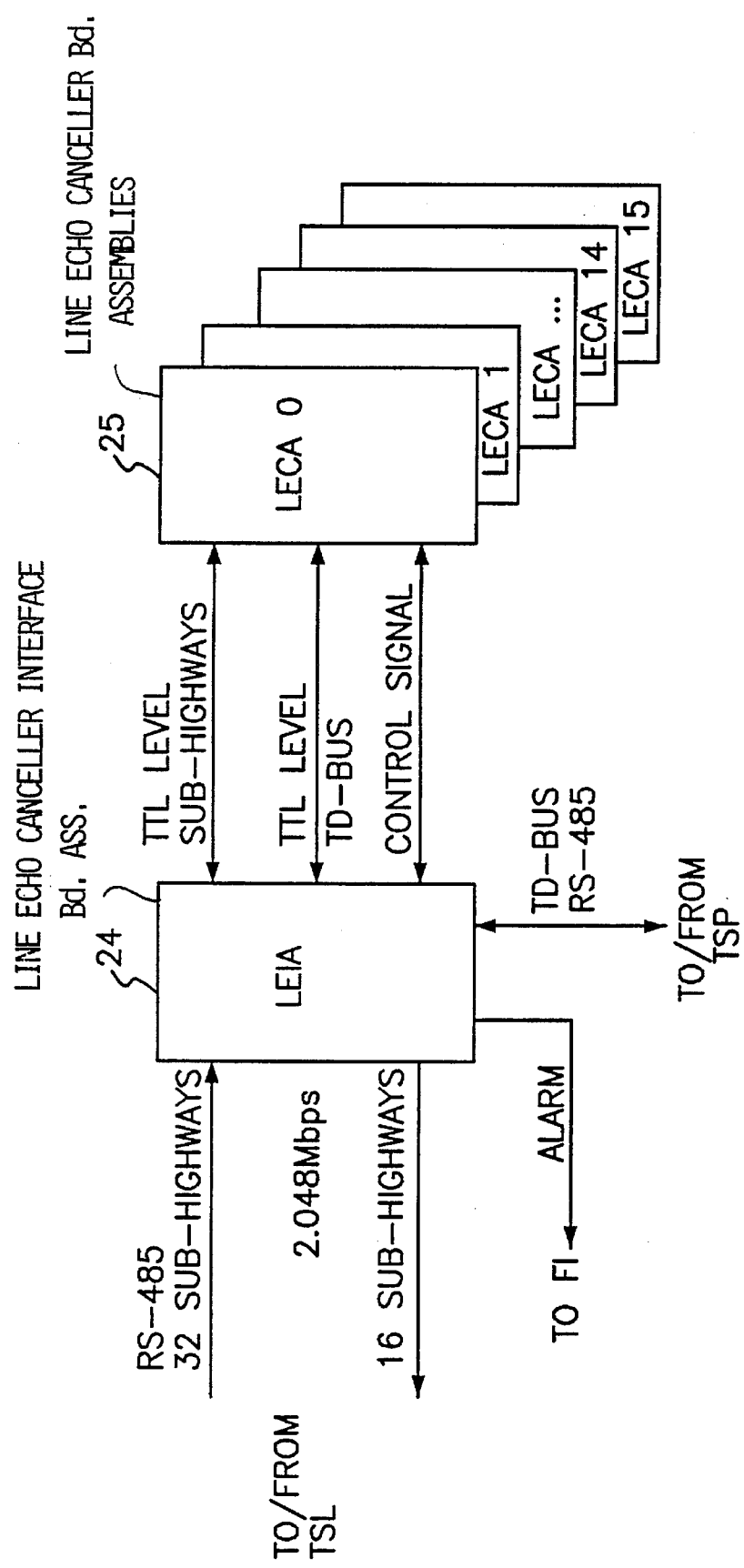
FIG. 3 is a detailed block diagram of an echo canceller in FIG. 2.

Referring to FIG. 3, there is shown a detailed block diagram of the echo canceller 15 in FIG. 2. In this drawing, the reference numeral 24 designates a line echo canceller interface board assembly (LEIA) and the reference numeral 25 designates 16 line echo canceller board assemblies (LECAs).

In addition to the LEIA 24 and the LECAs 25, the echo canceller 15 comprises a power board assembly for supplying power to the LEIA 24 and the LECAs 25 and a backboard for accommodating the assemblies.

The operation of the echo canceller 15 with the above-mentioned construction in accordance with the present invention will hereinafter be described in detail.

The LEIA 24 includes a sub-highway interface circuit for receiving sub-highway data of PCM 32 channels (2.048 Mbps) from the time switch 16, converting the received data into TTL levels and transmitting echo-cancelled sub-highway data of PCM 32 channels (2.048Mbps) of TTL levels, and a processor interface circuit for performing an interface function with the TSP 19 which controls the time switch 16 and the echo canceller 15. The LEIA 24 also provides an alarm signal for an external fault interface (FI).

Each of the LECAs 25 is adapted to receive the subhighway data of the PCM 32 channels from the time switch 16 converted into the TTL levels by the LEIA 24 and information from the TSP 19 to perform an echo cancellation function and transmit the result to the time switch 16 through the LEIA 24. Since the echo canceller 15 has the 16 LECAs 25 and each LECA 25 has a processing capacity of 32 channels as mentioned above, it can perform the echo cancellation function for a total of 512 channels. Each of the LECAs 25 includes 8 digital signal processors (DSPs), not shown, each of which performs the echo cancellation function for 4 channels. The DSP is adapted to perform the echo cancellation function using a real-time adaptive digital algorithm. Upon initialization of the LECA 25, a controller allows an echo cancellation program to be downloaded from a booting ROM to an internal RAM of the DSP. The DSP is operated based on the downloaded echo cancellation program. The PCM data to be processed by the DSP is received from the time switch 16 through a serial port and the LEIA 24. The data processed by the DSP is transmitted to the time switch 16 through the serial port under the control of the LEIA 24.

Figure 4:
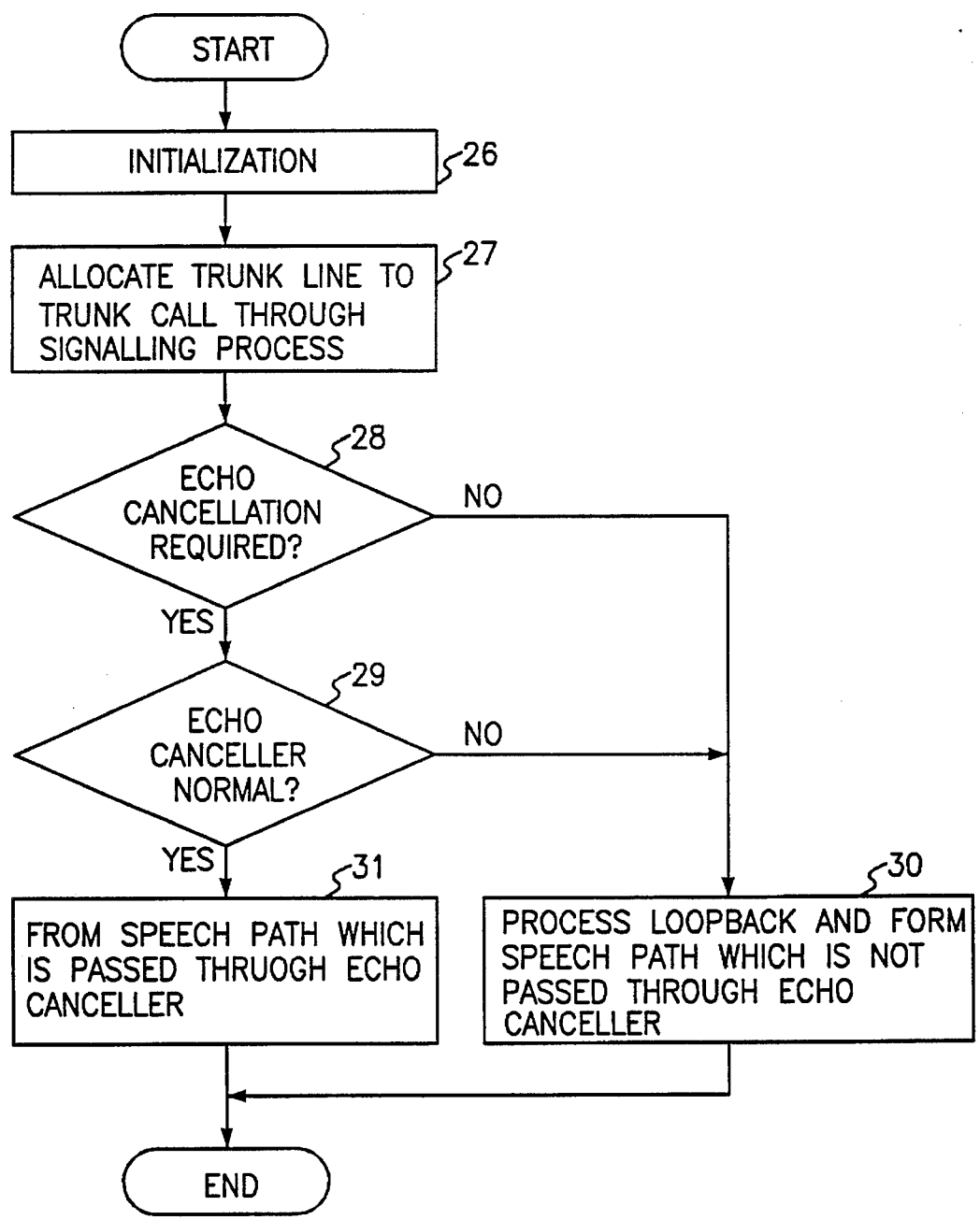
FIG. 4 is a flowchart illustrating a speech path switching control method in accordance with the present invention.

FIG. 4 is a flowchart illustrating a speech path switching control method in accordance with the present invention. First, the ASP 23, the TSP 19, the DTIP 22 and the LSP 21 in the system are initialized for the process of the trunk call at the step 26. If the system is normally ready to process the trunk call, a trunk line is allocated to the trunk call through a signalling process of the trunk line interface circuit 17, the time switch 16, the local service device 18 and the LSP 21 at the step 27. In this case, the signalling process is performed regardless of any of input and output trunk calls. Also, the signalling process is not connected in any shape with the echo canceller 15.

Then, the ASP 23 discriminates at the step 28 whether the echo cancellation is required for the trunk call allocated with the trunk line.

If it is discriminated at the step 28 that the echo cancellation is not required for the trunk call allocated with the trunk line, or if it is discriminated at the step 29 that a corresponding one of the LECAs 25 of the echo canceller 15 is abnormal although the echo cancellation is required, the voice data from the trunk line interface circuit 17 is applied to the time switch 16 through the sub-highways Rx of the RS-485 type, each of which accommodates the PCM 32 channels (2.048 Mbps), at the step 30. Then at the step 30, the data is time-switched by the time switch 16 under the control of the TSP 19 and transferred to the mobile subscriber through the optical link SNLRx, the space switch SSW and the time switch accommodating the mobile subscriber.

In the case where it is discriminated at the step 28 that the echo cancellation is required for the trunk call allocated with the trunk line, it is discriminated under the control of the TSP 19 at the step 29 whether the corresponding one of the LECAs 25 of the echo canceller 15 is normal. If it is discriminated at the step 29 that the corresponding one of the LECAs 25 of the echo canceller 15 is normal, the voice data from the trunk line interface circuit 17 is applied to the corresponding LECA 25 of the echo canceller 15 through the sub-highways ECTxin of the RS-485 type, each of which accommodates the PCM 32 channels (2,048 Mbps), at the step 31. Then at the step 31, the received voice data is echo-cancelled by the corresponding LECA 25 of the echo canceller 15 under an echo cancellation command from the TSP 19 and applied to the time switch 16 through the sub-highways ECTxout of the RS-485 type, each of which accommodates the PCM 32 channels (2,048 Mbps). Then, the data is time-switched by the time switch 16 under the control of the TSP 19 and transferred to the mobile subscriber through the optical link SNLRx, the space switch SSW and the time switch accommodating the mobile subscriber. As a result, the echo-cancelled voice data is transmitted to the mobile subscriber.

On the other hand, in the case where it is discriminated at the step 29 that the corresponding LECA 25 of the echo canceller 15 is detached or becomes abnormal in the middle of the echo cancellation, the LEIA 24 is operated in response to an abnormal signal from the corresponding LECA 25 to prevent the speech from being blocked. Namely, the LEIA 24 loops back the sub-highway data of the TTL levels including a corresponding speech channel and transmits the looped-back data to the time switch 16 through the sub-highways ECTxout of the RS-485 type, each of which accommodates the PCM 32 channels (2.048 Mbps). As a result, the speech is made possible even in the presence of the echo. Thereafter, when the corresponding LECA 25 of the echo canceller 15 becomes normal, the loopback is released at once and the echo cancellation is then continuously performed.

If the fault occurs in the entire echo canceller 15 in operation, the speech path is changed under the control of the TSP 19 not to be passed through the echo canceller 15, at the step 30. Thereafter, when the echo canceller 15 becomes normal, the speech path returns to the original state.

As apparent from the above description, according to the present invention, the echo canceller does not need a PCM trunk interface circuit, a signalling interface circuit and a disabling circuit, required by the conventional echo canceller. The echo canceller is linked with the time switch regardless of the type of the trunk line requiring the echo cancellation, such as, for example, the T1 type (1.544 Mbps) of 24 channels or the E1 type (2.048 Mbps) of 32 channels. Also, the echo canceller is not built in the trunk line, resulting in no degradation of the reliability of the trunk line. The echo canceller works with the time switch only when the echo cancellation is required. Therefore, the effective and economical echo cancellation can be performed by a relatively small number of echo cancellers. Further, since the echo canceller works with the time switch to perform the echo cancellation, it can freely be allocated under the control of the time switch control processor regardless of the trunk channel position. This has the effect of coping flexibly with the occurrence of the fault in the echo canceller.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A speech path switching control apparatus comprising:
    time switching means for receiving PCM voice data from a space switch through a switch network link and performing time slot interchange with trunk lines;
    echo cancellation means connected to said time switching means through a plurality of sub-highways to cancel echoes;
    access switching control means for discriminating whether echo cancellation is required for a trunk call allocated with a particular one of the trunk lines and outputting the resultant discrimination signal; and
    time switching control means for controlling said time switching means and said echo cancellation means in response to the discrimination signal from said access switching control means.

2. A speech path switching control apparatus as set forth in claim 1, wherein said echo cancellation means includes:
    a line echo canceller interface board assembly having a sub-highway interface circuit for receiving sub-highway data of PCM 32 channels from said time switching means, converting the received data into TTL levels and transmitting echo cancelled sub-highway data of PCM 32 channels of TTL levels, and a processor interface circuit for performing an interface function with said time switching control means; and
    a plurality of line echo canceller board assemblies, each of said line echo canceller board assemblies receiving the sub-highway data of the PCM 32 channels from said time switching means converted into the TTL levels by said line echo canceller interface board assembly and information from said time switching control means to perform an echo cancellation function and transmitting the result to said time switching means through said line echo canceller interface board assembly.

3. A method of operating a speech path switching control apparatus having time switching means, echo cancellation means, time switching control means and access switching control means, comprising the steps of:
    (a) initializing said time switching means, said echo cancellation means, said time switching control means and said access switching control means, allocating a trunk line to a trunk call through a signalling process and allowing said access switching control means to discriminate whether echo cancellation is required for the trunk call allocated with the trunk line;
    (b) forming under control of said time switching control means a speech path which is not passed through said echo cancellation means, if it is discriminated at said step (a) that the echo cancellation is not required for the trunk call allocated with the trunk line, and discriminating whether said echo cancellation means is normal, if it is discriminated at said step (a) that the echo cancellation is required for the trunk call allocated with the trunk line;
    (c) looping back sub-highway data of TTL levels including a speech channel, if it is discriminated at said step (b) that said echo cancellation means is not normal, and transmitting the looped-back data to said time switching means through subhighways, each of which accommodates PCM 32 channels, to form under the control of said time switching control means the speech path which is not passed through said echo cancellation means; and
    (d) forming a speech path which is passed through said echo cancellation means, if it is discriminated at said step (b) that said echo cancellation means is normal.

* * * * *